(12) United States Patent
Mace et al.

(10) Patent No.: US 6,935,568 B2
(45) Date of Patent: Aug. 30, 2005

(54) SINGLE-LEVER THERMOSTATIC CARTRIDGE USING CERAMIC DISKS

(75) Inventors: Christian Mace, Vert le Grand (FR); Jean Chamot, Arpajon (FR)

(73) Assignee: Vernet S.A., Arpajon Cedex (FR)

( * ) Notice: Subject to any disclaimer, the term of this patent is extended or adjusted under 35 U.S.C. 154(b) by 240 days.

(21) Appl. No.: 10/465,887

(22) Filed: Jun. 20, 2003

(65) Prior Publication Data

US 2003/0234295 A1 Dec. 25, 2003

(30) Foreign Application Priority Data

Jun. 21, 2002 (FR) .............................................. 02 07735

(51) Int. Cl.$^7$ .............................................. G05D 23/13
(52) U.S. Cl. ................... 236/12.2; 137/625.41
(58) Field of Search ....................... 236/12.2; 137/625.4, 137/625.41

(56) References Cited

U.S. PATENT DOCUMENTS

| | | | | |
|---|---|---|---|---|
| 4,617,965 A | * | 10/1986 | Lorch | ..................... 137/625.17 |
| 4,887,642 A | * | 12/1989 | Bernat | ..................... 137/625.41 |
| 5,329,958 A | * | 7/1994 | Bosio | ........................ 137/269 |
| 5,494,077 A | | 2/1996 | Enoki et al. | |
| 6,089,462 A | * | 7/2000 | Osvaldo | ..................... 236/12.2 |

FOREIGN PATENT DOCUMENTS

WO  96/26475  8/1996

* cited by examiner

*Primary Examiner*—William E. Tapolcai
(74) *Attorney, Agent, or Firm*—Wenderoth, Lind & Ponack, L.L.P.

(57) ABSTRACT

The cartridge comprises a body in which there is formed a mixed fluid chamber; a fixed disk; a movable disk; thermostatic regulation means including a regulation slide-valve and a thermostatic element which are mechanically connected to each other; and a single control lever for controlling the flowrate and the temperature of the mixed fluid and adapted to drive the movable disk in rotation and in translation and to move the thermostatic element inside the mixed fluid chamber. Cold fluid inlet passage and cold fluid return passage in the fixed disk extend approximately end-to-end in circumferential arcs with substantially equal radii and hot fluid inlet passage and the hot fluid return passage in the fixed disk extend approximately end-to-end in circumferential arcs with substantially equal radii. Application to the field of mixer taps.

10 Claims, 8 Drawing Sheets

SINGLE-LEVER THERMOSTATIC CARTRIDGE USING CERAMIC DISKS

TECHNICAL FIELD

The present invention relates to a single-lever thermostatic cartridge using ceramic disks and to a mixer tap including this kind of cartridge.

BACKGROUND ART

Most mixer taps using cartridges with ceramic disks currently fitted to sinks or washbasins cannot effectively stabilize the temperature of the outflowing fluid, referred to herein as the "mixed" fluid, in the event of significant and/or sharp variations in the pressure and/or temperature of either or both of the incoming fluids, referred to herein as the "hot fluid" and the "cold fluid".

Cartridges of this type have therefore been proposed in the past that are equipped with a thermostatic element to regulate the temperature of the outflowing fluid.

The document WO 96/26475 in particular discloses a single-lever thermostatic cartridge for use in "mixer" taps in which the flowrate and the temperature of the outflowing fluid are adjusted by operating a single control, whence the term "single-lever". This type of cartridge adjusts the flowrate and the temperature by means of two superposed ceramic disks, the lower disk including respective upward passages for the cold and hot fluids and respective downward passages for the cold and hot fluids. The temperature of the outflowing mixed fluid is thermostatically regulated by a temperature regulation slide valve downstream of and below the lower disk and fastened to a thermostatic regulation element familiar to the person skilled in the art.

However, the diameter available for the regulator slide valve and the fluid flow sections are limited by the geometry of the cartridge, in particular by the relative disposition of the upward and downward passages for the cold and hot fluids. Because the flowrates of the fluids to be mixed are low, a weak flow results around the thermostatic element, whence poor temperature regulation, which is incompatible with the standards in force for thermostatic taps, and a low output flowrate, which limits the range of potential applications.

This drawback is all the more marked when the cartridge dimensions suit mixer taps with a standardized outside diameter of the order of 46 mm, with the aim of enabling replacement of a non-regulated cartridge with a thermostatically regulated cartridge.

An object of the invention is to remedy these drawbacks by proposing a single-lever thermostatic cartridge which regulates temperature more effectively than prior art cartridges over a wide range of flowrates.

DISCLOSURE OF THE INVENTION

To this end, the invention provides a single-lever thermostatic cartridge comprising a body in which there is formed a mixed fluid chamber; a disk fixed relative to said body and provided with an inlet passage and a return passage at least for cold fluid and an inlet passage and a return passage at least for hot fluid; a disk movable relative to the fixed disk and provided with a cold fluid passage adapted to establish communication between the cold fluid inlet passage and the cold fluid outlet passage in the fixed disk and a hot fluid passage adapted to establish communication between the hot fluid inlet passage and the hot fluid return passage in the fixed disk; thermostatic regulation means including a regulation slide-valve in the mixed fluid chamber downstream of the cold and hot fluid return passages and a thermostatic element at least partly inside the mixed fluid chamber and to which the regulation slide valve is mechanically connected; and a single control lever for controlling the flowrate and the temperature of the mixed fluid and adapted to drive the movable disk relative to the fixed disk in rotation and in translation and to move the thermostatic element inside the mixed fluid chamber, which cartridge is characterized in that the cold fluid inlet passage and the cold fluid return passage in the fixed disk extend approximately end-to-end in circumferential arcs with substantially equal radii, and in that the hot fluid inlet passage and the hot fluid return passage in the fixed disk extend approximately end-to-end in circumferential arcs with substantially equal radii.

Other features of the above cartridge, which can be adopted individually or in any technically feasible combination, include the following:

- the radii of the circumferential arcs of the cold fluid passages of the fixed disk and the radii of the circumferential arcs for the hot fluid passages of the fixed disk are substantially equal;
- the fixed disk includes, for the same, cold or hot, fluid, a plurality of separate inlet passages and/or a plurality of separate return passages;
- for the same, cold or hot, fluid, the inlet passages and the return passages form an alternating succession of passages;
- the cartridge includes a nut for controlling the temperature of the mixed fluid, which nut is rotationally coupled to the control lever and includes an annular flange in plane sliding contact with the movable disk and a cylindrical body on which the control lever is mounted to rock;
- the thermostatic regulation means include a screw for adjusting the temperature of the mixed fluid, which screw is fixed against rotation relative to the body and received in a substantially complementary thread carried by the body of the control nut, the thermostatic element bearing against said screw;
- an overtravel spring is disposed inside the mixed fluid chamber and between the regulation slide valve and the thermostatic element;
- overtravel spring is housed radially inside an exterior ring of the regulation slide valve;
- the cartridge includes a member for generating turbulence having an irregularly shaped interior surface facing a temperature-sensitive portion of the thermostatic element.

The invention also provides a mixer tap equipped with a cartridge as defined above, which includes a handle fastened to the control lever of the cartridge for controlling the flowrate and the temperature of the mixed fluid.

BRIEF DESCRIPTION OF THE DRAWING

The invention will be better understood on reading the following description, which is given by way of example only and with reference to the drawings, in which.

DETAILED DESCRIPTION

Figure 1:
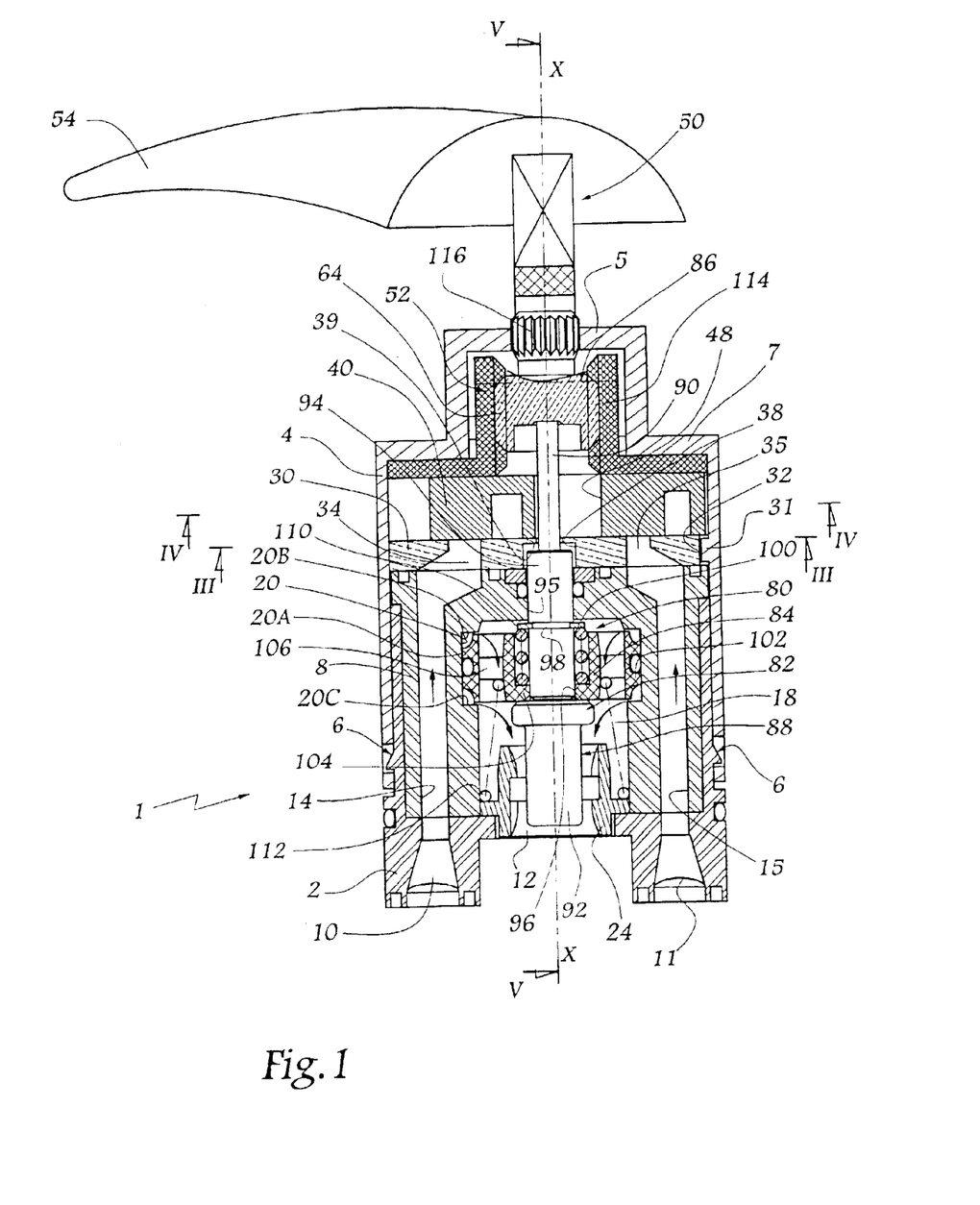
FIG. 1 is a diagrammatic view in longitudinal section taken along the line I—I in FIG. 3 of a thermostatic cartridge of the invention with its control handle in a "zero flowrate" position.
Figure 2:
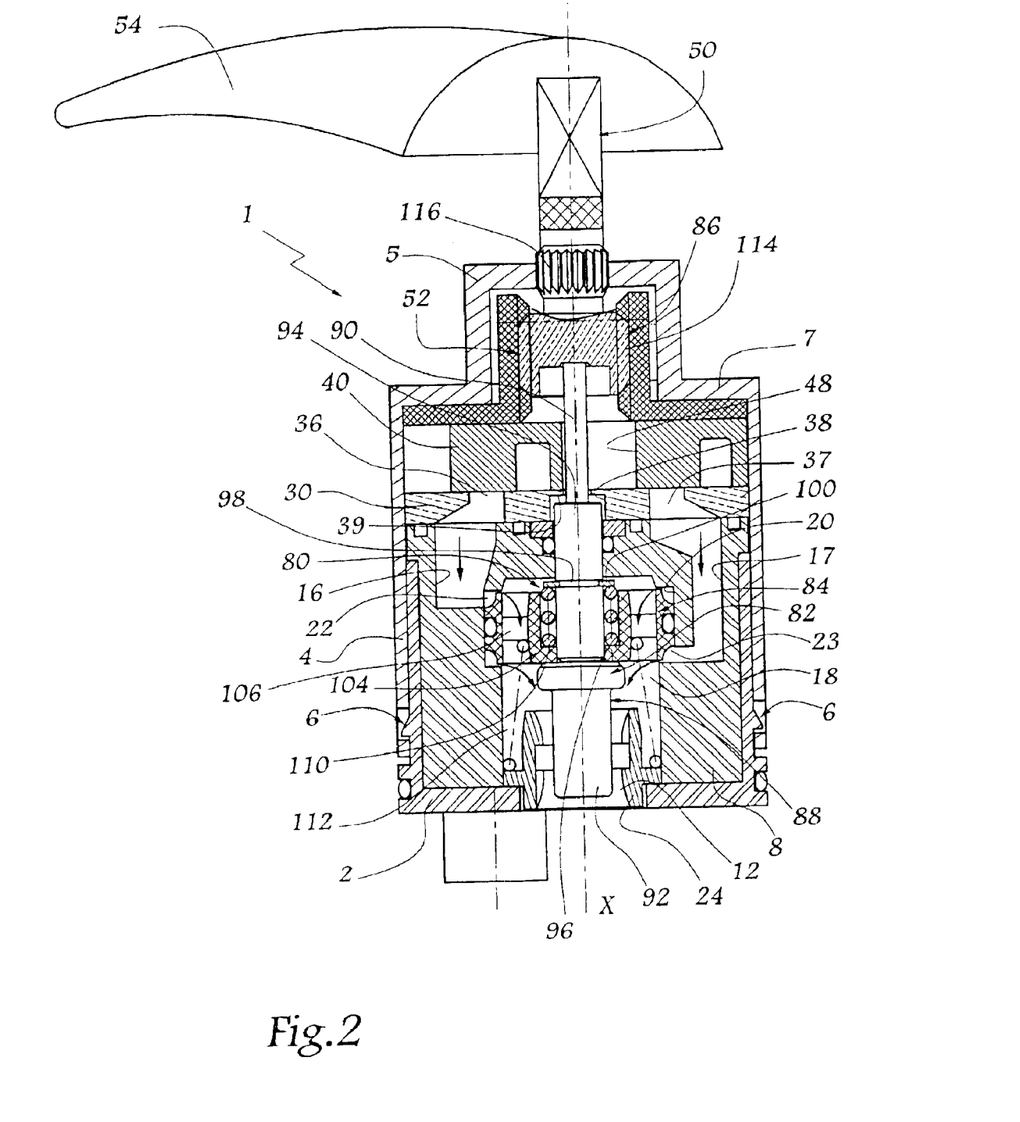
FIG. 2 is a view analogous to FIG. 1 and in section taken along the line II—II in FIG. 3, also with the control handle in a "zero flowrate" position.

FIGS. 1 and 2 show a thermostatic cartridge 1 extending longitudinally along a central axis X—X and adapted to be fitted to a mixer tap. In the remainder of the description references to the lower portion of the cartridge refer to the portion that is shown in the lower part of FIG. 1.

The cartridge 1 includes a circular casing 2 at the bottom and a circular cap 4 at the top which is adapted to be positioned coaxially with the casing 2 and fastened thereto by clipping arrangements 6. The casing and the cap have a common axis X—X.

A generally cylindrical cartridge body 8 is accommodated inside the casing 2 and the cap 4. It shares the axis X—X. The body 8 and the casing 2 are fixed relative to each other.

The lower portion of the casing 2 forms an eccentric cold water inlet passage 10 and an eccentric hot water inlet passage 11, the passages 10 and 11 being substantially parallel to the axis X—X. The lower portion of the casing 2 also forms a central mixed water outlet passage 12.

A cold water inlet duct 14 and a hot water inlet duct 15 which are both parallel to the axis X—X (see FIG. 1) are formed in the body 8 opposite the passages 10 and 11. As shown in FIG. 2, a cold water return duct 16 and a hot water return duct 17 are also provided in the cartridge body 8. The radial distances between the axis X—X and the inlet ducts 14, 15 and return ducts 16, 17 are substantially equal, and the inlet and outlet ducts are offset angularly from each other in a plane perpendicular to the axis X—X so as not to communicate directly with each other.

A central mixer chamber 18 is delimited within the body 8. An annular groove 20 in the upper portion of the chamber 18 is coaxial with the axis X—X. The cold water return duct 16 (FIG. 2) communicates with the chamber 18 via a cold water return passage 22 discharging into the upper portion of the groove 20. In the same way, the cold water return duct 17 (FIG. 2) communicates with the chamber 18 via a hot water return passage 23 discharging into the lower portion of the groove 20.

The lower portion of the mixer chamber 18 communicates with the outlet passage 12 via an annular turbulence generator member 24 often referred to as a "turbulator". The turbulator has an irregularly shaped interior surface adapted to produce a homogeneous temperature in the flow at the exit from the cartridge 1.

To enable the inlet ducts 14 and 15 to communicate with the return ducts 16 and 17, the cartridge 1 includes two superposed ceramic disks, namely a lower disk 30 and an upper disk 40, which are described in more detail later.

The lower disk 30 is mounted on the cartridge body 8 so that it is coaxial with and fixed with respect to the axis X—X. To this end, it is retained by the cap 40 both in translation, because its outside diameter is substantially equal to the inside diameter of the cap, and in rotation, for example by means by radial projections 31 fastened to the cap 4, facing toward the interior of the cap, and retained in corresponding notches 32 formed at the periphery of the disk 30. The projection/notch combination can be seen in FIG. 1. The fixed disk 30 further includes a series of internal passages shown in detail in FIG. 3.

Figure 3:
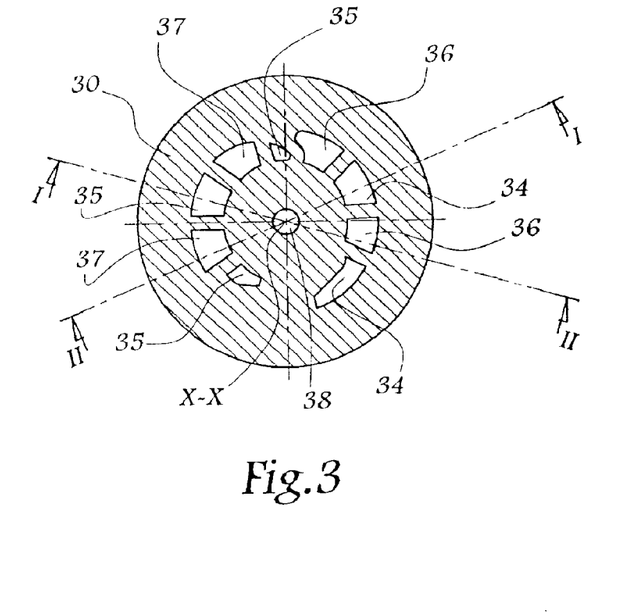
FIG. 3 is a view in section taken along the line III—III in FIG. 1 of a lower disk of the cartridge shown in FIGS. 1 and 2.

To be more precise, the disk 30 includes two cold water inlet passages 34, three hot water inlet passages 35, two cold water return passages 36, and two hot water return passages 37.

The cold water inlet passages 34 are connected to the cold water inlet duct 14, the upper portion of which divides into two branches, only one of which can be seen in FIG. 1, so that the cold water flowing upward feeds both passages 34. Similarly, the hot water inlet passages 35 are connected to the hot water inlet duct 15 whose upper portion is divided into three branches, only one of which can be seen in FIG. 1, and each of which communicates with one of the three passages 35.

The cold water return passages 36 communicate with the cold water return ducts 16 and the hot water return passages 37 likewise communicate with the hot water return ducts 17.

The passages 34 to 37 in the disk 30 are in the shape of circumferential arcs centered on the central axis X—X, their respective inside and outside radii being approximately equal. Moreover, the cold water passages 34 and 36 are disposed approximately end-to-end with a small gap between them and with the inlet passages 34 alternating with the outlet passage 36, and together subtend an angle of less than 180°. Similarly, the hot water passages 35 and 37 are disposed approximately end-to-end with a small gap between them and with the inlet passages 35 alternating with the outlet passage 37, and together subtend an angle less than 180°, in the portion of the circumference more or less opposite that occupied by the cold water passages 34 and 36.

A central axial hole 38 passes completely through the lower disk 30. As shown in FIGS. 1 and 2, the hole 38 is staggered to form an intermediate shoulder 39.

Figure 4:
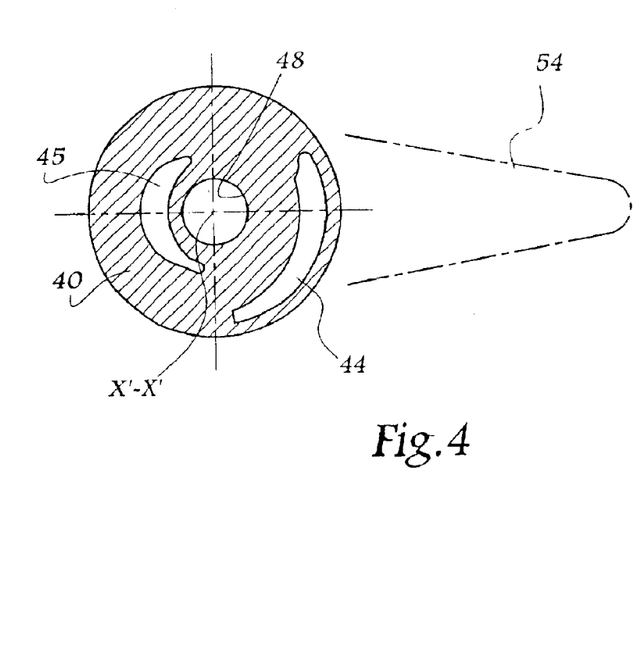
FIG. 4 is a view in section taken along the line IV—IV in FIG. 1 of an upper disk of the cartridge shown in FIGS. 1 and 2, together with a diagrammatic representation of the control handle shown in FIG. 1.

The upper disk 40, whose axis is the axis X'—X', and which is shown in more detail in FIG. 4, is mounted on the lower disk 30. It is movable relative to the fixed disk 30 in rotation about the central axis X—X of the cartridge and in translation in a plane parallel to the disk 30, the diameter of the disk 40 being less than that of the disk 30.

Drive means for the movable disk 40 are described in detail hereinafter.

The disk 40 includes two internal fluid passages, namely a cold water passage 44 and a hot water passage 45. The passages 44 and 45 are in the shape of circumferential arcs centered on the central axis X'—X' of the disk 40. They do not open onto the upper face of the disk 40 and thus form water circulation chambers which extend over slightly less than respective opposite half-circumferences of the disk.

Depending on the angular position of the movable disk 40 relative to the fixed disk 30, the cold water passage 43 connects at least one of the cold water inlet passages 34 and at least one of the cold water return passages 36 and the hot water passage 45 connects at least one of the hot water inlet passages 35 and at least one of the hot water return passages 37, as is explained in more detail later, when describing how the cartridge 1 works.

A central axial hole 48 passes completely through the disk 40.

The means for driving the movable disk 40 relative to the fixed disk 30 essentially include a control lever 57 and a control nut 52 made of a synthetic material, for example. An actuator handle 54 is attached to the lever 50 whose stirrup-shaped body comprises two parallel branches 58 parallel to the axis X—X. The branches 58 extend downward into the interior of the cartridge 1, passing through openings 60 of generally circular arc shape centered on the axis X—X in the shoulder 7 of the cap 4.

Figure 5:
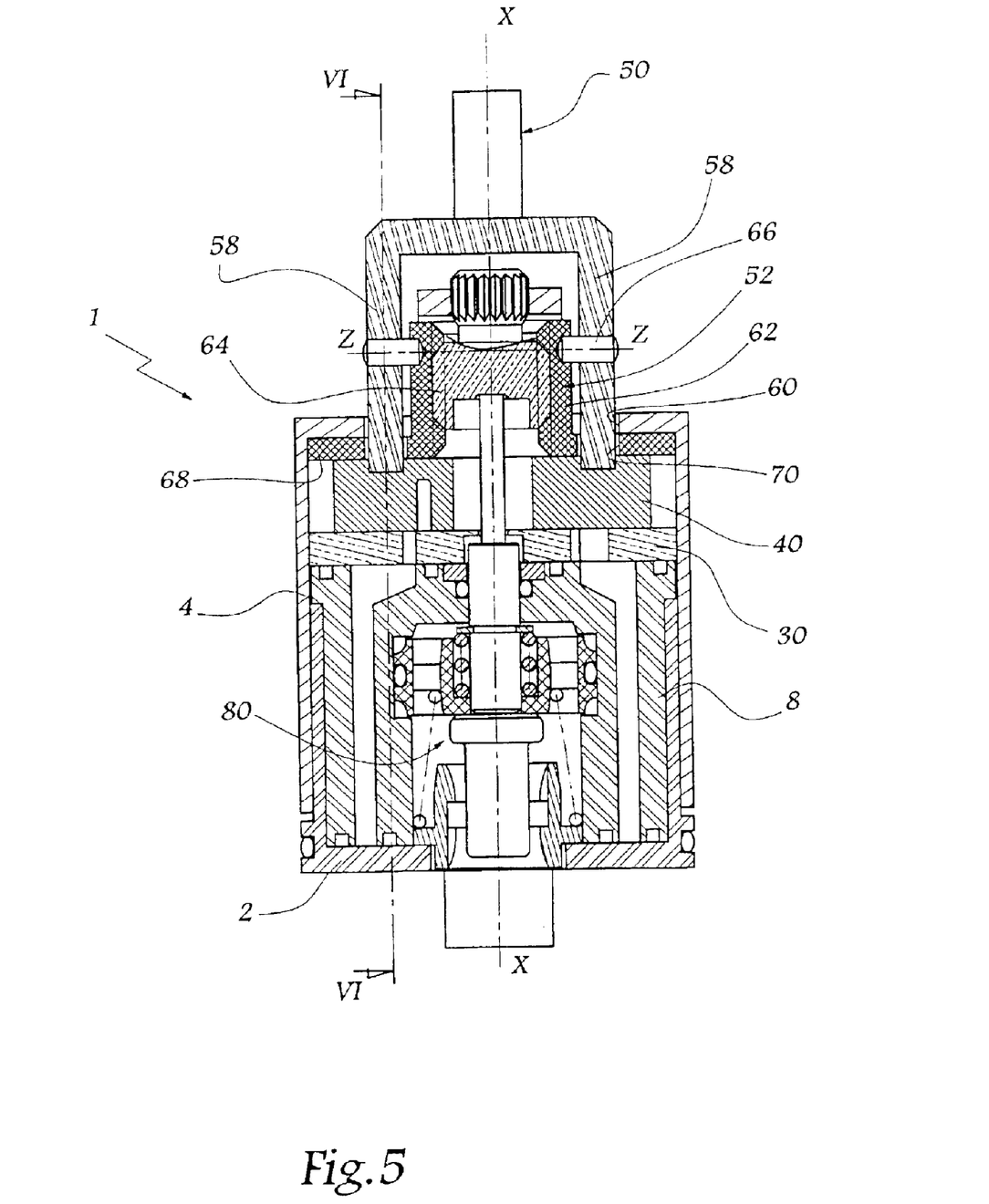
FIG. 5 is a diagrammatic view of the FIG. 1 cartridge in longitudinal section taken along the line V—V in FIG. 1.
Figure 6:
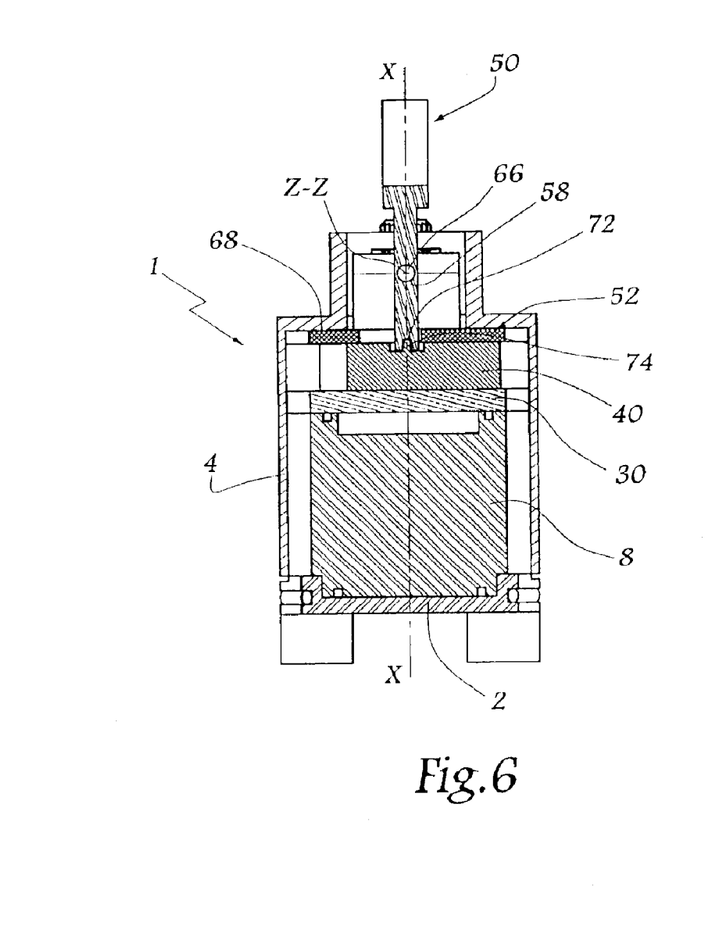
FIG. 6 is to a smaller scale than the above figures and is a view in section taken along the line VI—VI in FIG. 5.

As shown in FIG. 5, the nut 52 has a cylindrical body 62 substantially coaxial with the axis X—X and incorporating an internal screwthread 64. The body 62 has fastened to it two pins 66 that are symmetrical with respect to the axis X—X and project toward the exterior of the body 62, in a direction substantially perpendicular to the axis X—X, as far as the branches 58 of the control lever 50. The pins 66 thus form an axis Z—Z about which the lever 50 rocks.

An annular flange 68 integral with and substantially perpendicular to the control nut 52, and whose outside diameter is substantially equal to the inside diameter of the cap 4, is disposed between the shoulder 7 of the cap and the upper face of the movable disk 40, forming an axial locking system. The flange 68 therefore slides in plane bearing engagement on the disk 40 and on the cap 4, the friction force between these two components being substantially zero.

Figure 7:
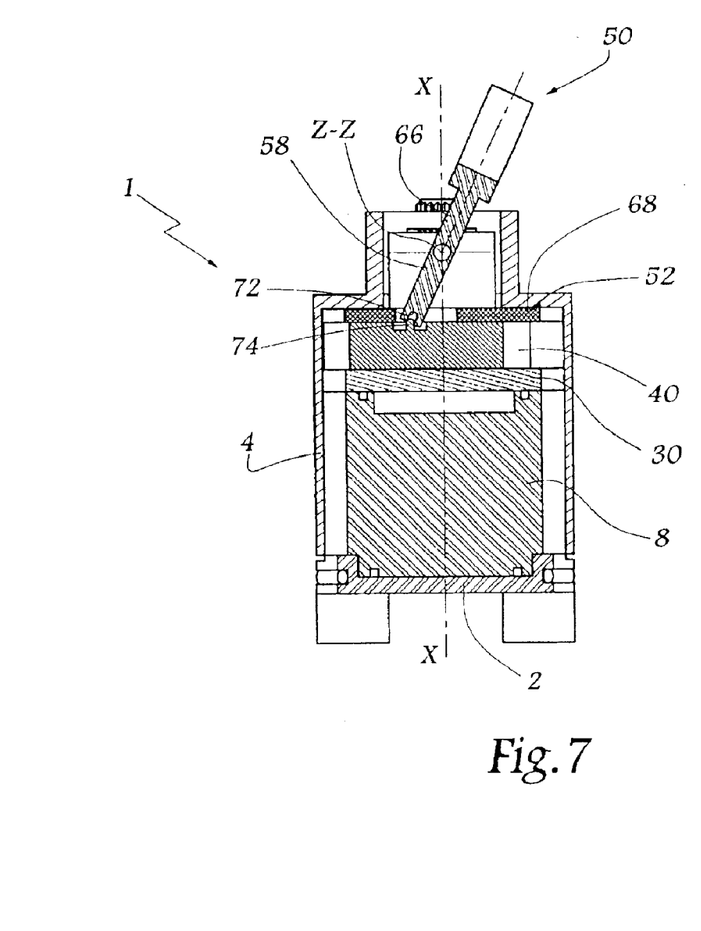
FIG. 7 is a view analogous to FIG. 6 with a control lever of the cartridge in a "full flowrate" position.
Figure 8:
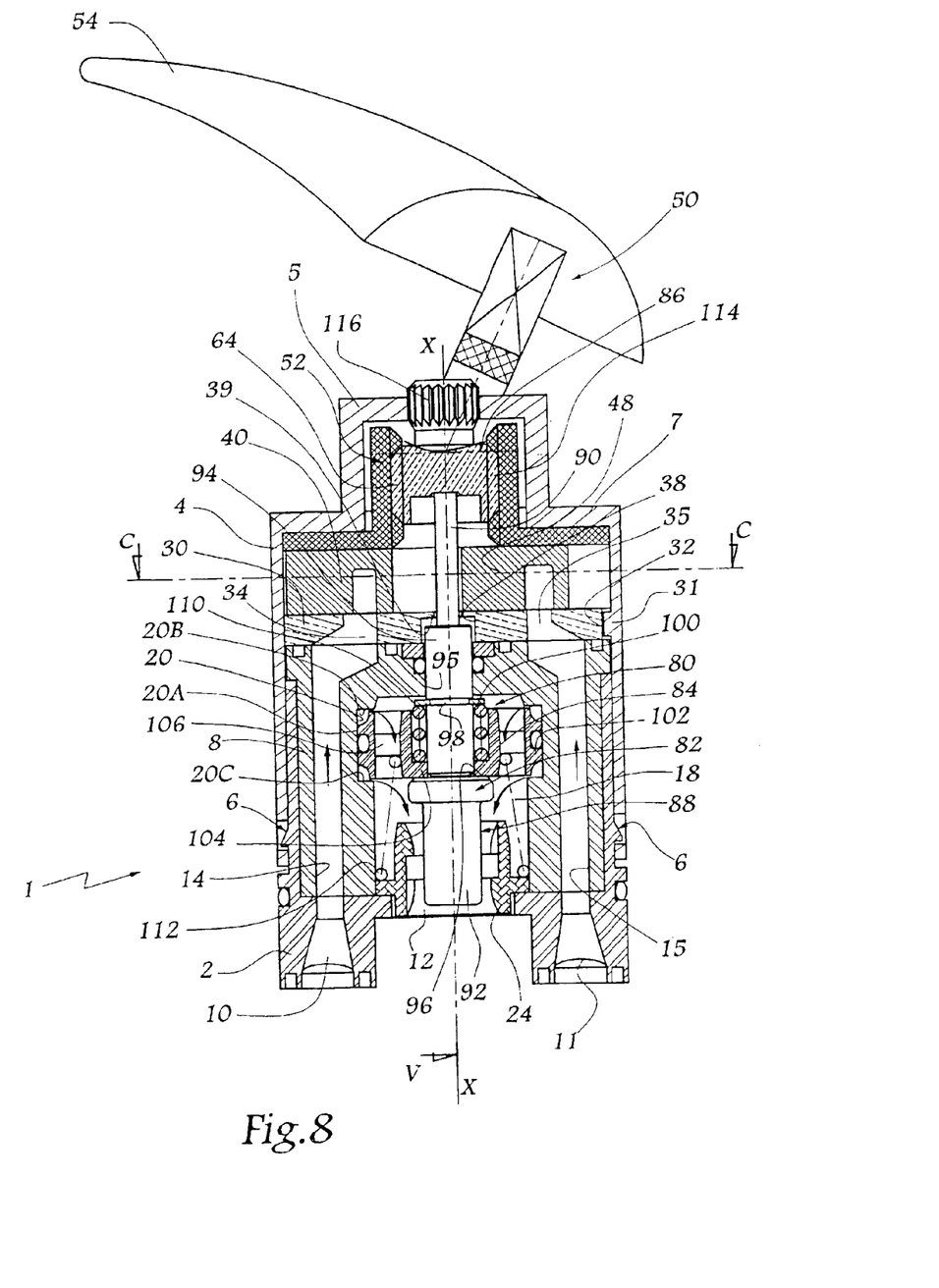
FIGS. 8 and 9 are views analogous to FIGS. 1 and 2 with the control lever in the "full flowrate" position shown in FIG. 7.
Figure 9:
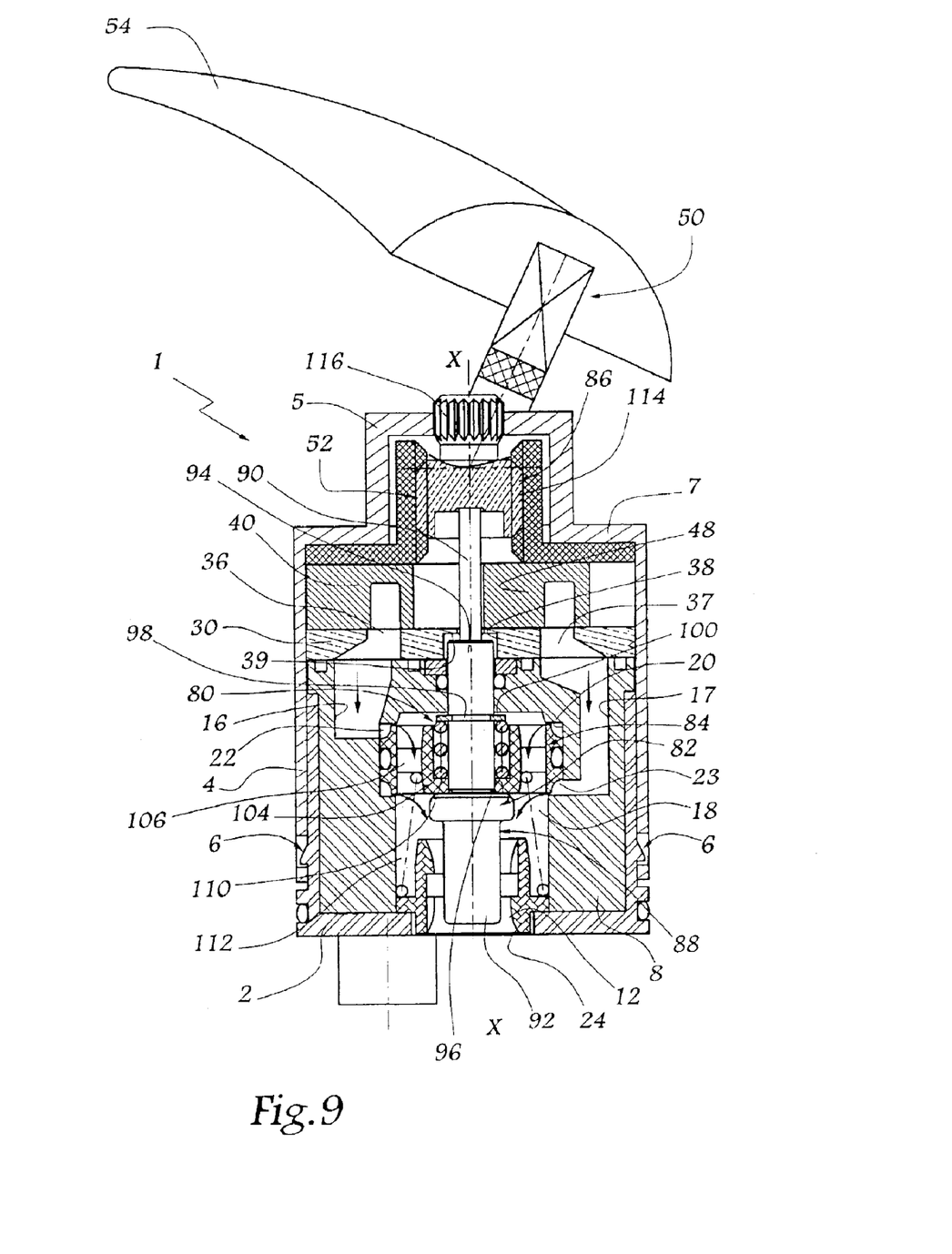

The free ends of the branches 58 of the control lever 50 are received in two openings 70 in the flange 68, perpendicular to the axis Z—Z, and facing the openings 60 in the shoulder 7. As shown in more detail in FIG. 7, the ends of these branches have a notch 72 of substantially complementary shape to a stud 74 provided on the upper face of the disk 40.

As a result, the movable disk 40 is controlled only by the lever 50. When the lever 50 is rocked about the axis Z—Z, the notches 72 on the branches 58 entrain the disk 40 in translation in a plane substantially perpendicular to the axis X—X and in a direction perpendicular to the rocking axis Z—Z; if the control lever 50 is rotated about the axis X—X, the branches 58 entrain the disk 40 in rotation through the intermediary of the notches 72 and the studs 74.

The cartridge 1 also includes thermostatic regulation means 80. Referring again to FIGS. 1 and 2, the thermostatic regulation means 80 essentially comprise a thermostatic element 82, a regulation slide valve 84 mechanically connected to the thermostatic element 82, and an adjuster screw 86 mechanically connected to the thermostatic element 82.

The thermostatic element 82, which is familiar to the person skilled in the art, has an elongate body 88 coaxial with the axis X—X and a rod 90 aligned with the body 88, and the body and rod are movable in translation relative to each other in a direction parallel to the axis X—X.

The body 88 of the thermostatic element 82 has a temperature-sensitive portion 92 containing a predetermined quantity of expandable wax. The temperature-sensitive portion 92 is situated inside the mixer chamber 18, the turbulator 24 extending around and at a distance from it. The turbulator 24 encourages heat exchange between the mixed water and the temperature-sensitive portion 92.

The body 88 of the element 82 further includes a bush 94 adapted to accommodate at least part of the rod 90 on relative movement in translation of the body 88 and the rod 90. The upper part of the bush is received in sealed fashion in an opening 95 through the region of the cartridge body 8 forming the ceiling of the chamber 18, and opens into the central hole 38 in the fixed disk 30. The larger diameter portion of the hole 38 forms a recess in the disk 30 to allow the thermostatic element to move freely.

The bush 94 has an outside diameter smaller than the maximum diameter of the temperature-sensitive portion 92, and a shoulder 96 is therefore formed at the junction between the bush and the temperature-sensitive portion. Moreover, an annular groove 98 in the main portion of the bush 94 receives a rigid washer 100, for example a split metal ring.

The rod 90 of the thermostatic element 82 is inside the hole 38, its outside diameter being less than the smallest diameter of the hole 38, and inside the central hole 48 in the movable disk 40. The rod 90 therefore extends as far as the adjuster screw 86, and the upper end of the rod bears on the lower face of the screw.

The generally cylindrical regulator slide valve 84, whose axis is the axis X—X, is inside the mixer chamber 18. It includes an outer ring 102 whose outer perimeter cooperates with the annular groove 20 to regulate the quantity of hot water and cold water reaching the chamber 18. To be more precise, the ring 102 is mounted with sliding contact on the back wall 20A of the groove 20, i.e. the radially outermost wall delimiting the groove. The upper lateral wall 20B of the groove 20 forms a cold water regulation seat for the ring 102 of the slide valve 84, for which the lateral wall 20C forms a hot water regulation seat.

The slide valve 84 also has an inner ring 104 rigidly connected to the outer ring 102 by spokes 106 and having a shoulder facing inward in its lower portion to form a cup for receiving a cylindrical spring 110, which is referred to herein as an overtravel spring for a reason explained later, and disposed along its axial length between the shouldered portion of the ring 102 and the stop washer 100. Thus the spring 110 is entirely radially inside the ring 102.

The regulator slide valve 84 is therefore mechanically connected firstly to the body 88 of the thermostatic element 82 by the cylindrical spring 102, with its inner ring 104 bearing on the shoulder 96, and secondly to the cartridge body 8 by a frustoconical return spring 112 disposed between the turbulator 24 and the spokes 106 of the slide valve. As a result, the spring 112 holds the turbulator pressed against a shoulder in the casing 2 delimiting the outflow passage 12 and provides the loading necessary for correct action of the thermostatic element 82 via the slide valve 84.

The adjuster screw 86 has an external thread 114 meshing with the thread 64 in the control nut 52 and a head 116 with a splined exterior surface meshing with corresponding splines in the head 5 of the cap 4. The screw 86 is therefore prevented from rotating relative to the cap 4. Moreover, when the control lever 50 is rocked about the axis X—X, the branches 58 drive the control nut 52 via the pins 66, causing movement in translation of the screw 86 via the threads 64 and 114.

This is how the thermostatic cartridge 1 works:

Cold water enters the cartridge via the passage 10 in the casing 2, rises up the duct 14 in the body 8, takes at least one of the passages 34, circulates in the passage 44, descends via at least one of the return passages 36 in the disk 30 and then via the corresponding duct(s) 16, and reaches the mixer chamber 18 if the regulator slide valve 84 is not pressed onto the seat formed by the wall 20C of the groove 20. At the same time, hot water enters the cartridge 1 via the passage 11, rises up the duct 15, takes at least one of the passages 35 in the disk 30, circulates in the passage 45 in the disk 40, descends through at least one of the passages 37 in the disk 30, takes the corresponding return duct(s) 17, and expands into the chamber 18 via the passage 23 if the slide valve 84 is not pressed against the seat formed by the wall 20B of the groove 20.

At the bottom of the slide valve 85, the hot water and the cold water begin to mix, and mixing continues around the temperature-sensitive portion 92 of the thermostatic element 82 and inside the turbulator 24 inserted into the outflow passage 12 through which the mixed water exits.

The flowrate of the mixed water is adjusted by rocking the control lever 50 about the axis Z—Z defined by the pins 66, causing movement in translation of the movable disk 40 relative to the fixed disk 30 in a plane perpendicular to the axis X—X. The flow sections for the hot water and the cold water resulting from the superposition of the two disks vary between fully closed and fully open. For example, if the control lever is in the position shown in FIG. 7, i.e. for a flowrate regarded as the maximum flowrate, the thermostatic cartridge 1 is as shown in FIGS. 8 to 12.

Figure 10:
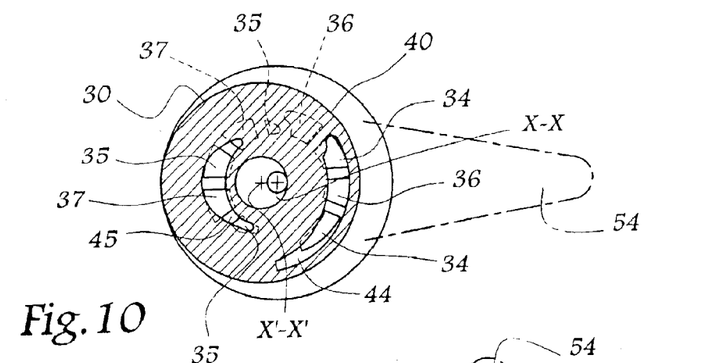
FIGS. 10 to 12 are diagrammatic views in section taken along the line C—C in FIG. 8 and showing the superposition of the lower and upper disks shown in FIGS. 3 and 4 and the control handle, and respectively corresponding to an outflow of lukewarm fluid, an outflow of essentially cold fluid, and an outflow of essentially hot fluid.
Figure 11:
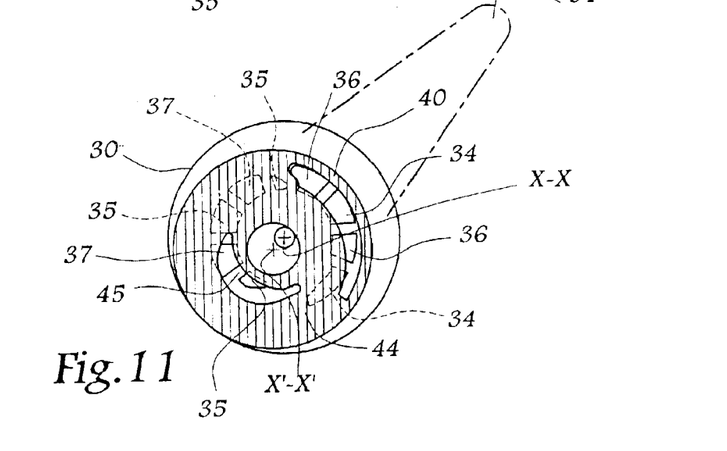
Figure 12:
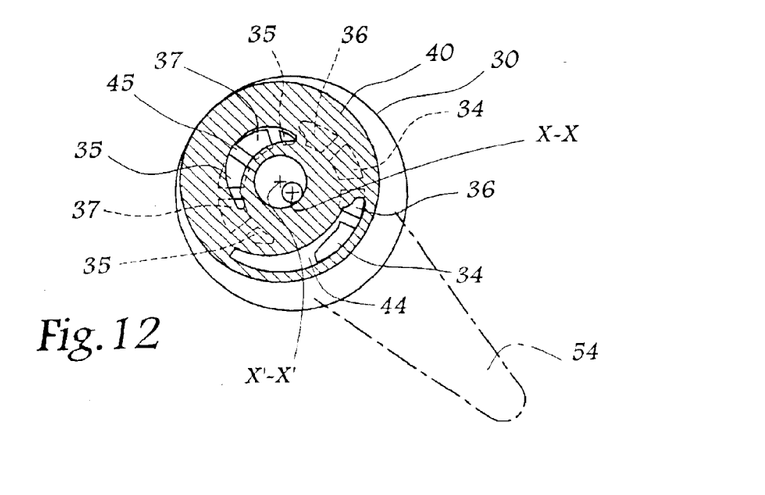

The temperature of the mixed water is adjusted by turning the control lever 50 around the axis X—X. This rotates the movable disk 40 relative to the fixed disk 30, regardless of the position to which the lever 50 has been rocked. This increases or decreases the flow sections for the hot water and the cold water relative to each other resulting from the superposition of the two disks, the shape of the passages 34 to 37, 44 and 45 being adapted so that, if the handle 54 attached to the lever 50 is moved upward in FIGS. 10 to 12 (i.e. toward the right if the handle is pointing toward the user), the flow section of the cold water is significantly larger than that for hot water (FIG. 11), and vice-versa if the handle of the control lever is moved toward the left (FIG. 12). When the handle 54 occupies a median position between its extreme left and extreme right positions, the cold water and hot water flow sections are substantially equal, and the mixed water is lukewarm (FIG. 10). The operation just described is substantially analogous to that of mixer cartridges with no thermostatic regulation means.

In a position of the lever 50 such that it is fixed against rotation relative to the remainder of the cartridge 1, the thermostatic regulation means 80 operate as follows: if the temperature of the mixed water in the chamber 18 increases, for example because of a drop in the cold water supply pressure, additional heat is transmitted to the expandable wax in the temperature-sensitive portion 92 of the thermostatic element 82, which generates an additional thrust force between the body 88 of the thermostatic element and its rod 90. Because the rod 90 bears against the screw 86, which is retained axially by the control nut 52, the thermostatic element 80 lengthens, its body 88 moving away from the rod 90. This reduces the gap between regulation slide valve 84 connected to the thermostatic element 82 and the seat formed by the wall 20C of the groove 20, which decreases the flow section for hot water and increases the flow section for cold water. This reduces the temperature of the mixed water. When the temperature of the mixed water decreases, the operation of the thermostatic regulator means 80 is the opposite of the above. The corrections of the temperature of the mixed water by the means 80 balance out when the temperature stabilizes at a preset value that depends on the height at which the rod 90 of the thermostatic element 82 terminates.

Accordingly, if the control lever is turned about the axis X—X, in addition to the movement of the disk 40 described above, the rotation of the control nut 52 entrains the adjuster screw 86 in translation in a direction parallel to the axis X—X, the screw 86 being fixed against rotation relative to the cap 4 by the splines on its head 116. The thermostatic element 82 as a whole is then subjected to the same movement in translation, the body 88 of the thermostatic element 82 tending to move in translation in the opposite direction because of the correction of the temperature of the mixed water by the regulator slide valve 84, in accordance with the principle explained above. The pitch of the threads 64 and 114 is adapted to allow adjustment of the temperature of the mixed water by the control handle 58 and temperature correction by the thermostatic regulation means 80, so as to impose a required temperature on the mixed water, as indicated for example by a graduated ring attached to the exterior face of the cap 4. In other words, the height at which the rod 90 of the thermostatic element terminates is directly imposed by the rotation position of the handle 54 relative to the cartridge 1. To limit the adjustment temperature to a maximum value, for example 50° C. or 55° C., at the "drawing" point, a stop system is advantageously provided, for example in the form of an axial stop for the adjuster screw or stops between the control nut 52 and a graduated ring attached to the exterior face of the cap 4. In this way the handle 54 can be rotated between two extreme positions (cold and hot) offset by substantially 90°.

Furthermore, if the cold water is cut off, the thermostatic element 82 senses only hot water, the rod 90 expands greatly, the regulator slide valve 84 moves relative to the body 8 until it comes into contact with the seat formed by the wall 20C of the groove 20, and the washer 100 compresses the spring 110 over a corresponding overtravel. This automatically shuts off the hot water, preventing all risk of scalding, thereby adding an anti-scalding safety feature to the cartridge 1.

Disposing the cold and hot fluid inlet and return passages of the fixed disk 30 on circumferential arcs with substantially the same radius provides a mixer chamber 18 of large inside diameter, the dimension of the regulator slide valve 84 then being greater than in prior art thermostatic cartridges. Because of this, for the same flowrate, the thermostatic regulation function of the cartridge is more effective, whilst still enabling it to be operated by a single lever.

Moreover, the large available volume of the mixer chamber 18 means that the overtravel spring 110 and the return spring 112 can be placed therein, avoiding the need to place them outside (generally above) the cartridge body 8. This significantly reduces the overall size of the cartridge of the invention.

Diverse variants of and adaptations to the embodiment described above that will be obvious to the person skilled in the art can be envisaged.

What is claimed is:

1. A single-lever thermostatic cartridge comprising a body in which there is formed a mixed fluid chamber; a disk fixed relative to said body and provided with an inlet passage and a return passage at least for cold fluid and an inlet passage and a return passage at least for hot fluid; a disk movable relative to the fixed disk and provided with a cold fluid passage adapted to establish communication between the cold fluid inlet passage and the cold fluid return passage in the fixed disk and a hot fluid passage adapted to establish communication between the hot fluid inlet passage and the hot fluid return passage in the fixed disk; thermostatic regulation means including a regulation slide-valve in the mixed fluid chamber downstream of the cold and hot fluid return passages, and a thermostatic element at least partly inside the mixed fluid chamber and to which the regulation slide valve is mechanically connected; and a single control lever for controlling the flowrate and the temperature of the mixed fluid and adapted to drive the movable disk relative to the fixed disk in rotation and in translation and to move the thermostatic element inside the mixed fluid chamber, wherein the cold fluid inlet passage and the cold fluid return passage in the fixed disk extend approximately end-to-end in circumferential arcs with substantially equal radii, and in that the hot fluid inlet passage and the hot fluid return passage in the fixed disk extend approximately end-to-end in circumferential arcs with substantially equal radii.

2. A cartridge according to claim 1, wherein the radii of the circumferential arcs of the cold fluid passages of the fixed disk and the radii of the circumferential arcs for the hot fluid passages of the fixed disk are substantially equal.

3. A cartridge according to claim 1, wherein the fixed disk includes, for the same, cold or hot, fluid, a plurality of separate inlet passages and/or a plurality of separate return passages.

4. A cartridge according to claim 3, characterized in that, for the same, cold or hot, fluid, the inlet passages and the return passages form an alternating succession of passages.

5. A cartridge according to claim 1, wherein it includes a nut for controlling the temperature of the mixed fluid, which nut is rotationally coupled to the control lever and includes an annular flange in plane sliding contact with the movable disk and a cylindrical body on which the control lever is mounted to rock.

6. A cartridge according to claim 5, wherein the thermostatic regulation means include a screw for adjusting the temperature of the mixed fluid, which screw is fixed against rotation relative to the body and received in a substantially complementary thread carried by the body of the control nut, the thermostatic element bearing against said screw.

7. A cartridge according to claim 1, wherein an overtravel spring is disposed inside the mixed fluid chamber and between the regulation slide valve and the thermostatic element.

8. A cartridge according to claim 7, wherein the overtravel spring is housed radially inside an exterior ring of the regulation slide valve.

9. A cartridge according to claim 1, wherein it includes a member for generating turbulence having an irregularly shaped interior surface facing a temperature-sensitive portion of the thermostatic element.

10. A mixer tap equipped with a cartridge according to claim 1, wherein it includes a handle fastened to the control lever of the cartridge for controlling the flowrate and the temperature of the mixed fluid.

* * * * *